UNITED STATES PATENT OFFICE.

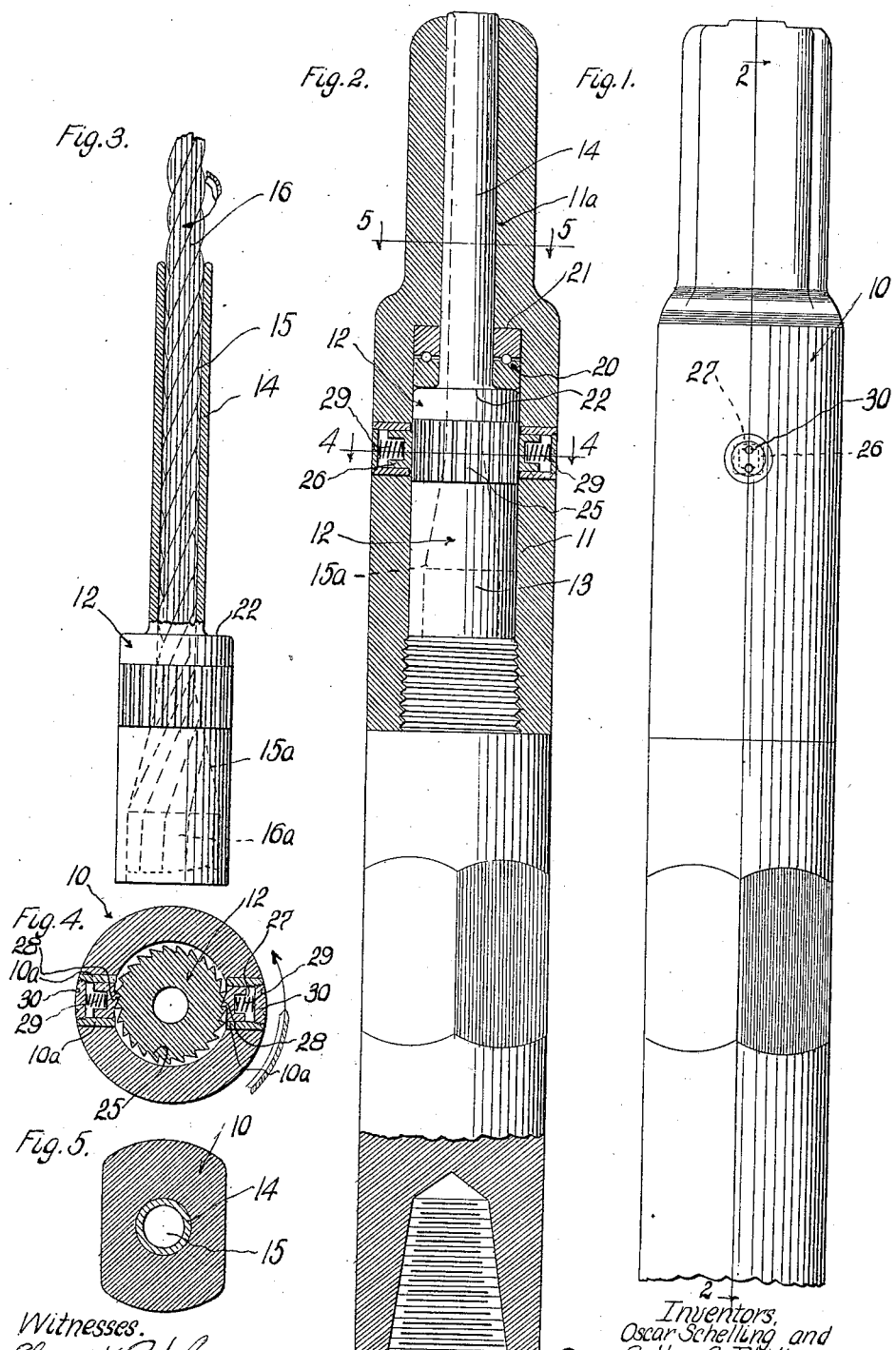

OSCAR SCHELLING AND ARTHUR A. PHILLIPS, OF LOS ANGELES, CALIFORNIA, ASSIGNORS OF ONE-THIRD TO GEORGE GARTLING, OF LOS ANGELES, CALIFORNIA.

ROPE-SOCKET.

1,090,570.

Specification of Letters Patent. Patented Mar. 17, 1914.

Application filed April 22, 1913. Serial No. 762,793.

*To all whom it may concern:*

Be it known that we, OSCAR SCHELLING and ARTHUR A. PHILLIPS, citizens of the United States, residing at Los Angeles, in the county of Los Angeles, State of California, have invented new and useful Improvements in Rope-Sockets, of which the following is a specification.

This invention relates to a swivel ratchet rope socket of a type for use in connection with wire drill cables; and the invention consist in certain specific improvements in the ratchet and pawl mechanism whereby we attain simplicity and durability of construction. There are other objects which will appear in the following specification.

One of the main features of our invention is the construction of the ratchet teeth integrally with the mandrel in which the rope is held, the teeth of the ratchet being cut directly in the mandrel. This mandrel is rotatively held in the body of the rope socket, end thrust ball bearings being preferably provided to obviate friction and to allow easy rotation of the tools connected to the socket. The pawls or dogs which engage the ratchet are mounted directly in the body in such manner as to have ample bearing surfaces therein, and the whole construction is such as to afford great strength and solidity.

The details of these features will be understood from the following specification, reference being had to the accompanying drawing, in which:

Figure 1 is an exterior view of our improved rope socket. Fig. 2 is a longitudinal section taken as indicated by line 2—2 of Fig. 1. Fig. 3 is a view, partly in longitudinal section, showing the construction of the mandrel in which the rope is held. Fig. 4 is a cross section taken as indicated by line 4—4 of Fig. 2. Fig. 5 is a cross section taken as indicated by line 5—5 of Fig. 2.
In the drawings the numeral 10 may designate the body of our improved rope socket constructed in accordance with our designs and having an interior bore 11 adapted to receive and hold the mandrel 12. The man- drel 12 is comprised in a lower cylindrical portion 13 and an upper tube or sleeve 14 which extends to the upper end of the body 10 through reduced bore 11$^a$ therein. The sleeve 14 has a longitudinal bore 15 through which the cable 16 is passed as shown in Fig. 3. The part 13 of the mandrel 12 contains an enlargement 15$^a$ of the bore 15; and the knotted or expanded end 16$^a$ of the cable 16 is held in this expanded portion 15$^a$ as in ordinary usage.

The mandrel is contained within the body 10 in the manner shown in Fig. 2 and an end thrust ball bearing 20 is placed between the annular shoulder 21 of the body and the annular shoulder 22 of the mandrel. This ball bearing supports the weight of the tools depending from the rope socket and allows the body of the rope socket and the tools to turn freely in the direction allowed by the ratchet mechanism.

The ratchet mechanism is comprised in ratchet teeth 25 cut around the mandrel 12, being formed integrally therein for strength and durability. The pawls for the ratchet teeth 25 are shown at 26. Pawls 26 are preferably rectangular or square in section and set in square openings 27 in insert 10$^a$ in body 10. They are each provided on their inner ends with a suitable tooth 28 to engage the ratchet teeth 25; and springs 29 press them into said engagement. The inserts 10$^a$ have square or rectangular openings in which the pawls are adapted to reciprocate; and the pawls are thereby given broad bearing surfaces through which any and all strains are transmitted practically directly to the body of the socket. The inserts are forced or pressed into place so that they form, to all intents, parts of the body; but have the advantage of being made of hardened steel as separate pieces. Plugs 30 hold the springs 29 in place and cover the pawls. The springs 29 may be of any nature; it being sufficient to the purpose of our invention that they press the pawls toward the ratchet teeth. The main feature of the pawls is their direct mounting in the body and their straight line motion so that they at all times rest solidly against surfaces of the body.

It will be seen that our construction provides for direct transmission of any rotary strain from the body 10 through the pawls and the ratchet teeth to the mandrel 12. The pawls or dogs 26 are mounted in their square openings so as to have ample bearing faces and so as to solidly and strongly connect with the body 10. When the tools depending from the rope socket tend to turn the socket in the direction indicated by the arrow in Fig. 4, the pawls slip easily over the ratchet teeth and allow the tools to turn; but when the tools have a tendency to turn in the opposite direction, the pawls engage the ratchet teeth to prevent such movement by locking the body 10 of the rope socket against rotation on the mandrel 12. We have shown a cable 6 in place in Fig. 3; and, it being assumed that the upper end of the cable is held from rotation, a rotation of the lower end in the direction indicated in Fig. 3 will tend to twist the cable more tightly, while rotation in the opposite direction would tend to untwist the cable.

It will be seen that the ratchet arrangement prevents rotation of the tools in the direction indicated in Fig. 3; that is, it locks the parts of the socket together when there is any tendency to rotate in that direction. But, should the tools rotate in the opposite direction, or in the direction indicated in Fig. 4, then the pawls will slip easily over the ratchet and will allow the tools to rotate without rotating the mandrel 14 and without having any untwisting tendency on the cable.

What we particularly wish to secure to ourselves in the following claims is our simple and strong ratchet construction, including the ratchet teeth formed integrally in the mandrel in which the rope is held, and also including the pawls mounted in the body of the rope socket and having bearing faces which cause any strain to be transmitted directly between the body and the mandrel without causing any excessive localized strain on the pawls. By these means we are enabled to provide for long life of our rope socket, having few parts to wear and having no parts upon which excessive strains are imposed.

Having described our preferred form of invention, we claim:

1. A swivel rope socket, comprising an outer body having an interior longitudinal cylindrical bore, a rope receiving mandrel revoluble within said bore, ratchet teeth cut directly on the mandrel, there being apertures in the body extending radially outwardly from its inner bore adjacent the ratchet teeth on the mandrel, pawls fitting in said apertures so as to be guided in movements radially to and from the ratchet teeth, said pawls adapted to engage the ratchet teeth at their inner ends, and springs to hold said pawls against said ratchet teeth.

2. A swivel rope socket, comprising an outer body having an interior bore, a rope receiving mandrel in said bore, an end thrust bearing between the mandrel and the body, a set of ratchet teeth formed integrally on said mandrel, and pawls mounted in apertures in the body with broad bearing surfaces between the pawls and body.

3. A swivel rope socket comprising an outer body having an interior cylindrical bore, a rope receiving mandrel having a cylindrical portion revolubly fitting within said bore, an end thrust bearing between the mandrel and body, ratchet teeth formed integrally in said mandrel and extending around the cylindrical part thereof, said teeth being parallel to the axis of the mandrel, the said body having squared apertures extending radially from its interior bore through its walls, pawls of square cross section adapted to reciprocate in said apertures and to engage the said ratchet teeth at their inner ends, and springs for pressing said pawls into engagement with the ratchet teeth.

4. A swivel rope socket comprising an outer body having an interior cylindrical bore, a rope receiving mandrel having a cylindrical portion revolubly fitting within said bore, an end thrust bearing between the mandrel and body, ratchet teeth formed integrally in said mandrel and extending around the cylindrical part thereof, said teeth being parallel to the axis of the mandrel, the said body having squared apertures extending radially from its interior bore through its walls, pawls of square cross section adapted to reciprocate in said apertures and to engage the said ratchet teeth at their inner ends, coiled springs adapted to press the pawls into engagement with the ratchet teeth, and cap plates on the outside of the body to confine the springs.

5. A swivel rope socket comprising an exterior body having a cylindrical bore extending from end to end thereof and enlarged at one end, a rope receiving mandrel of cylindrical configuration similar to the bore of the body and adapted to revolubly fit therein, an end thrust ball bearing between the mandrel and the body, ratchet teeth cut directly in the mandrel around its larger cylindrical surface, there being square apertures opposite said ratchet teeth leading radially through the walls of the body, pawls of square cross section adapted to reciprocate in said apertures to and from the ratchet teeth, teeth on the inner end of the pawls to engage said ratchet teeth, cap plates on the outside of the body covering said apertures, and coiled springs arranged between said cap plates and the pawls to press the pawls into engagement with the ratchet teeth.

In witness that we claim the foregoing we have hereunto subscribed our names this 9th day of April 1913.

OSCAR SCHELLING.
ARTHUR A. PHILLIPS.

Witnesses:
ELWOOD H. BARKELEW,
JAMES T. BARKELEW.

Copies of this patent may be obtained for five cents each, by addressing the "Commissioner of Patents, Washington, D. C."